United States Patent [19]

Pakulsky et al.

[11] Patent Number: 5,393,089
[45] Date of Patent: Feb. 28, 1995

[54] VEHICLE AIR BAG COVER

[75] Inventors: Brian R. Pakulsky, Lapeer; Fred Daris, Clarkson; John Rust, Rochester; Randall J. Ryszewski, Grosse Pointe Woods; Thomas F. Soltys, Metamora, all of Mich.

[73] Assignee: Chrysler Corporation, Highland Park, Mich.

[21] Appl. No.: 114,407

[22] Filed: Sep. 1, 1993

[51] Int. Cl.6 .............................................. B60R 21/16
[52] U.S. Cl. .................. 280/728 B; 280/732
[58] Field of Search ................... 280/728 B, 731, 732

[56] References Cited

U.S. PATENT DOCUMENTS

| | | | |
|---|---|---|---|
| 3,640,546 | 2/1972 | Brawn | 280/732 |
| 3,756,617 | 9/1973 | Brown | 280/732 |
| 4,097,064 | 6/1978 | Ikawa et al. | 280/732 |
| 4,327,937 | 5/1982 | Scholz et al. | 280/732 |
| 4,334,699 | 6/1982 | Patzelt et al. | 280/731 |
| 4,752,083 | 6/1988 | Honda | 280/731 |
| 4,810,005 | 3/1989 | Föhl | 280/732 |
| 4,852,907 | 8/1989 | Shiraki et al. | 280/731 |
| 4,878,689 | 11/1989 | Mitzkus et al. | 280/731 |
| 4,895,389 | 1/1990 | Pack, Jr. | 280/732 |
| 5,056,814 | 10/1991 | Shiraki et al. | 280/731 |
| 5,064,217 | 11/1991 | Shiraki | 280/728 B |
| 5,069,477 | 12/1991 | Shiraki | 280/732 |
| 5,082,310 | 1/1992 | Bauer | 280/732 |
| 5,096,220 | 3/1992 | Nakajima | 280/728 B |
| 5,118,132 | 6/1992 | Nakajima | 280/728 B |
| 5,125,683 | 6/1992 | Nakajima | 280/731 |
| 5,172,931 | 12/1992 | Baba et al. | 280/728 B |

*Primary Examiner*—Kenneth R. Rice
*Attorney, Agent, or Firm*—Edward A. Craig

[57] ABSTRACT

A panel for an automotive vehicle comprising a wall having an opening, and an integral closure normally closing the opening and behind which an airbag is adapted to be stored. The closure comprises a pair of panels each connected to the wall of the instrument panel by an integral, flexible hinge. The panels are capable of swinging open in response to the force of impact of the airbag when the airbag inflates to that the inflating airbag may deploy through the opening. The hinges each have a trough-like arcuate portion adapted to absorb at least some of the force of impact of the inflating airbag and relieve stress and increase flexibility along the hinge to resist breaking of the doors when they swing open.

2 Claims, 2 Drawing Sheets

VEHICLE AIR BAG COVER

This invention relates generally to occupant restraining systems for automotive vehicles and refers more particularly to a panel behind which an air bag is adapted to be stored.

BACKGROUND AND SUMMARY

When an air bag is stored behind the instrument panel or center panel of a steering wheel of an automobile, the instrument panel must be constructed in a way which will cover and conceal the air bag but which will not interfere with its deployment. In the past, the panel has been formed with doors which swing apart to form an opening through which the air bag deploys. However, these doors are subjected to so much force upon impact by the expanding air bag that they sometimes rip loose or break-up, subjecting the occupant to the risk of serious injury. The doors have been reinforced to prevent them from breaking apart, but that has not solved the problem.

In accordance with the embodiment of the present invention to be described, the panel has a closure comprising a pair of doors which swing open on integral, flexible hinges when the air bag deploys. Each door hinge has an elongated trough-like arcuate portion which is adapted to absorb the force of impact of the inflating air bag, relieving stress and increasing flexibility along the hinge to resist breaking up of the door when it swings open.

Preferably the panel is covered with a padded layer, and the two doors, when closed, are flush with the wall of the instrument panel in a smooth external continuation of the exterior surface configuration thereof so that the outline of the doors does not show through the padding.

It is an object of this invention to provide an panel for an automotive vehicle behind which an air bag is stored which is constructed in a way that covers and conceals the air bag but will not interfere with its deployment, having the foregoing features.

Another object is to provide a panel which is of relatively simple construction, sufficiently strong and durable to withstand the force of impact of an expanding air bag without breaking up or tearing, and which is easy to manufacture and install.

Other objects, features and advantages of the invention will become more apparent as this description proceeds, especially when considered with the accompanying drawings.

DETAILED DESCRIPTION

Figure 1:
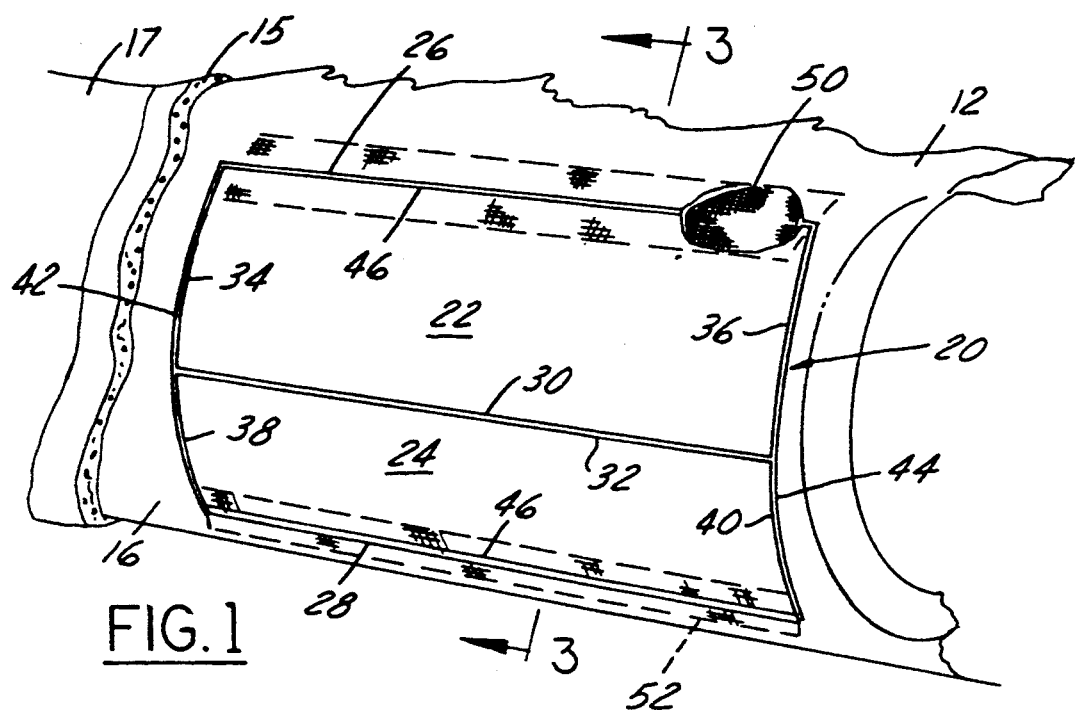
FIG. 1 is a fragmentary perspective view with parts broken away, of an instrument panel for an automotive vehicle constructed in accordance with the invention.
Figure 2:
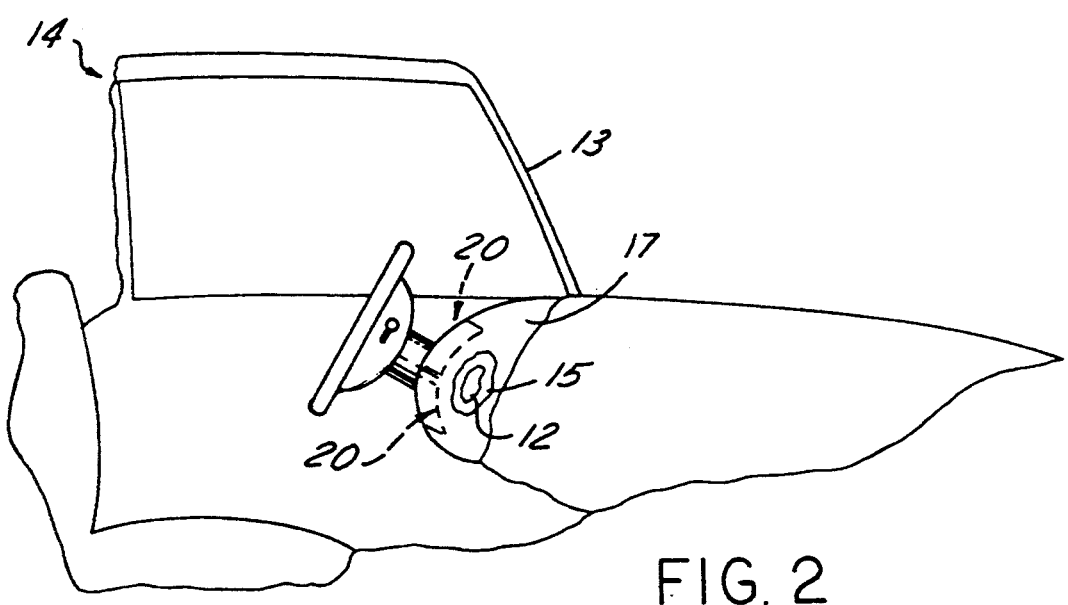
FIG. 2 is an end view of the instrument panel shown in FIG. 1, with parts broken away.
Figure 4:
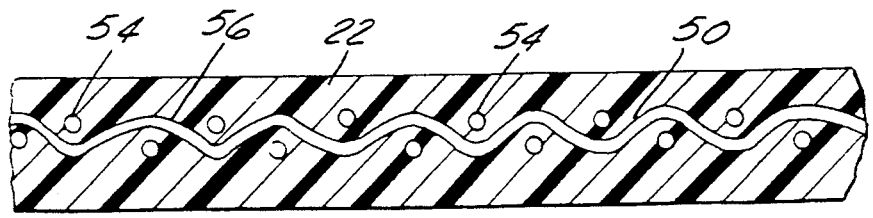
FIG. 4 is a fragmentary sectional view taken on the line 4—4 in FIG. 3.

Referring now more particularly to the drawings, an airbag 10 is normally concealed in an uninflated, confined condition forwardly of the instrument panel 12 of an automotive vehicle 14. The instrument panel 12 occupies its usual position beneath the windshield 13. Foam padding 15 covered by a layer of vinyl 17 or the like provides a decorative padded overlay for the instrument panel.

Figure 3:
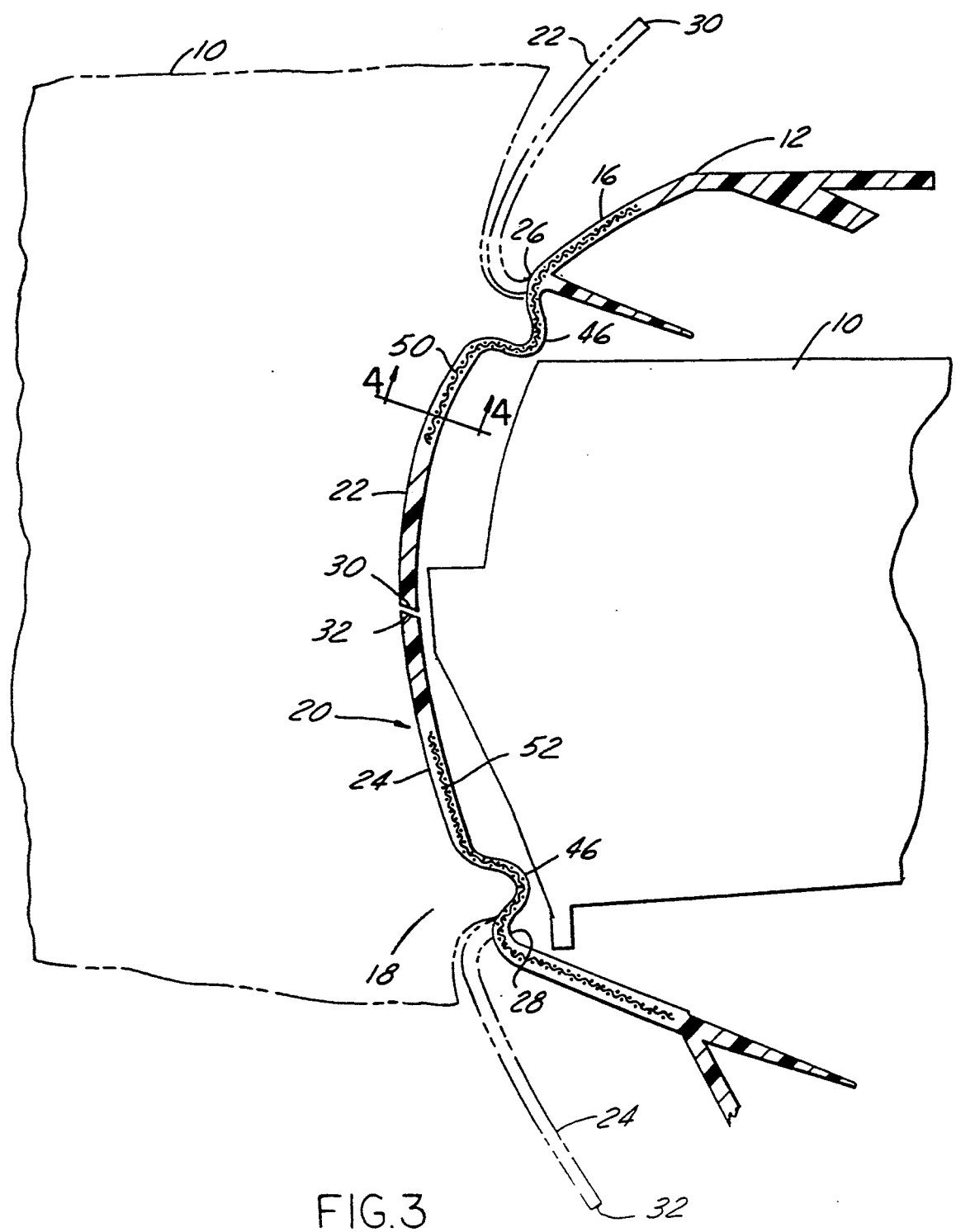
FIG. 3 is a sectional view taken on the line 3—3 in FIG. 1, showing a stored airbag in solid lines concealed by the instrument panel, and also showing the airbag in dotted lines when it is deployed. The padding covering the instrument panel is omitted for clarity.

The instrument panel 12 preferably made of a relatively stiff, self-supporting, flexible thermoplastic material such, for example, as a mixture of ACRYLONITRILE-BUTADIENE-STYRENE (ABS) and polycarbonate, molded to any desired configuration. The instrument panel 12 has a wall 16 formed with an opening 18 normally closed by an integral closure 20 consisting of two doors 22 and 24. The confined, uninflated airbag 10 is stored out of sight directly in front of the normally closed opening 18. The wall 16 and doors 22 and 24 are preferably molded to a uniform wall thickness as seen in FIG. 3.

The doors 22 and 24 preferably are of substantially identical rectangular form. Door 22 is connected at the top to wall 16 by an integral, horizontal hinge 26 which extends along the full length of the door. Door 24 is connected at the bottom to wall 16 by an integral, horizontal hinge 28 which extends along the full length of the door. The hinges 26 and 28 are parallel and spaced apart vertically. The swinging edges 30 and 32 of doors 22 and 24 are horizontal. When the doors are closed as shown in FIG. 1 and in solid lines in FIG. 3, these swinging edges substantially abut in a flush relationship. Also when the doors are closed, the vertical side edges 34 and 36 of door 22 are aligned, respectively, with the vertical side edges 38 and 40 of door 24. These side edges 34-40 substantially abut in a flush relationship with the vertical side edges 42 and 44 of the opening 18. Accordingly, the effect is that the doors provide a smooth external surface configuration in continuation of the external surface of wall 16 viewed from any angle. As a result, the closed doors are in effect "seamless" and nonvisible, that is, the doors do not show through the overlying foam padding 15 and vinyl layer 17.

The hinges 26 and 28 are identical. Each has an elongated, curved, trough-like arcuate portion 46 which extends the full length of the door. This arcuate portion 46 may be somewhat thinner than wall 16 and doors 22 and 24 and is more flexible. This hinge design reduces the strain or stress on the material, so that the doors will not become separated, that is, will not tear away, from the instrument panel, or break up in pieces when the doors suddenly swing open upon deployment of the airbag.

Scrim strips 50 and 52 are molded and imbedded into the instrument panel along the two hinges for reinforcement. Scrim strips 50 and 52 extend along substantially the full length of the respective hinges and also extend a small distance into the portions of the doors 22 and 24 and the wall 16 immediately adjacent thereto. The scrip strips each are preferably made of a mesh or woven screen type material fabricated of crossing filaments 54 and 56 of metal or fiberglass and are provided for purposes of reinforcement.

The doors 22 and 24 are normally closed in the natural or free state condition of the instrument panel, but are capable of swinging open about their hinges to the dotted line positions of FIG. 3 under the force of impact of the expanding airbag at the instant of a crash. The doors 22 and 24 break through the foam padding 15 and vinyl layer 17 when they swing open. The airbag then deploys through the opening 18 to a position protecting the occupant. The curved, arcuate portions 46 relieve stress and increase flexibility as the doors open, thereby resisting the tendency of the doors to break away or break up or disintegrate. These curved, arcuate portions tend to extend or flatten out when struck by the inflating airbag and thus provide a measured, rather than a sudden, distortion of the door hinges upon impact.

What is claimed is:

1. A panel for an automotive vehicle comprising:

a wall having an opening, an integral closure normally closing said opening and concealing a stored air bag before it is deployed through said opening in a crash, said wall and closure being formed of a relatively stiff, self-supporting, flexible material, said closure comprising first and second doors each connected to said wall by an integral, flexible hinge, said hinges being in spaced apart parallel relation and said doors being capable of swinging open on said hinges in response to the force of impact of the air bag thereagainst when the air bag inflates so that the inflating air bag may deploy through the opening, said hinges each being in the form of an open trough of arcuate cross-section free of sharp bends having a bottom portion formed in a smooth curve and also having smooth curved portions connecting into said wall and into the associated door, respectively, said hinges being adapted to absorb at least a portion of the force of impact of the inflating air bag and to relieve stress and resist breaking of said doors and separation of said doors from said wall, said hinges being of less thickness and greater flexibility than the portions of the wall and doors immediately adjacent thereto, and scrim strips embedded in said hinges to reinforce and strengthen said hinges.

2. A panel as defined in claim 1, wherein said panel is covered with a layer of padding, said doors having side edges which, when said doors are closed, are in substantially flush abutting relation with said wall, said doors having swinging edges which, when said doors are closed, are in substantially flush abutting relation with each other, whereby the outline of the doors does not show through the padding, said doors being capable of breaking through the padding when they swing open.

* * * * *